United States Patent [19]

Lacagnina

[11] Patent Number: 5,040,655

[45] Date of Patent: Aug. 20, 1991

[54] VARIABLE LENGTH ROLLER TABLE

[75] Inventor: Claudio Lacagnina, Varese, Italy

[73] Assignee: Pirelli Coordinamento Pneumatici S.p.A., Milan, Italy

[21] Appl. No.: 584,795

[22] Filed: Sep. 19, 1990

[30] Foreign Application Priority Data

Sep. 22, 1989 [IT] Italy .................... 21799 A/89

[51] Int. Cl.$^5$ ............................................ B65G 13/12
[52] U.S. Cl. .............................. 193/35 SS; 193/35 TE
[58] Field of Search ....................... 193/35 TE, 35 SS

[56] References Cited

U.S. PATENT DOCUMENTS

| | | | |
|---|---|---|---|
| 2,445,960 | 7/1948 | Mapes | 193/35 TE |
| 2,613,788 | 10/1952 | McLaughlin | 193/35 TE |
| 2,627,959 | 2/1953 | Seward | 193/35 TE |
| 2,732,922 | 1/1956 | McLaughlin | 193/35 TE |
| 2,760,617 | 8/1956 | Bowen | 193/35 TE |
| 2,826,290 | 3/1958 | Barski | 193/35 TE |
| 2,988,190 | 9/1961 | Tucker | 193/35 TE |
| 3,225,879 | 12/1965 | Falcon et al. | 193/35 TE |
| 3,276,558 | 10/1966 | Guske et al. | 193/35 TE |
| 4,911,279 | 3/1990 | Thunnissen | 193/35 SS |

FOREIGN PATENT DOCUMENTS

| | | | |
|---|---|---|---|
| 0307039 | 3/1989 | European Pat. Off. | 193/35 SS |
| 1303506 | 4/1987 | U.S.S.R. | 193/35 SS |
| 616895 | 1/1949 | United Kingdom | 193/35 TE |

*Primary Examiner*—D. Glenn Dayoan
*Attorney, Agent, or Firm*—Stevens, Davis, Miller & Mosher

[57] ABSTRACT

Roller table comprising a front supporting group and a rear supporting group defining respectively a front sliding surface and a rear sliding surface longitudinally aligned. A bearing bar, on which lifting levers are pivoted, is secured to the rear supporting group, the levers being mutually placed side-by-side and bearing in a rotatable manner ancillary rollers at their respective upper ends. Each lifting lever is provided in the lower part with a feeler pin engaged in a sliding manner along a guiding groove provided in a guiding bar integral with the front supporting group. The guiding groove is shaped in such a way that when the front and rear supporting groups are moved away the one from the other, the ancillary rollers are lifted one by one, one after the other, and led to the level of the front and rear sliding surfaces to support a product, during its working, in the portion between the spaced sliding surfaces.

5 Claims, 2 Drawing Sheets

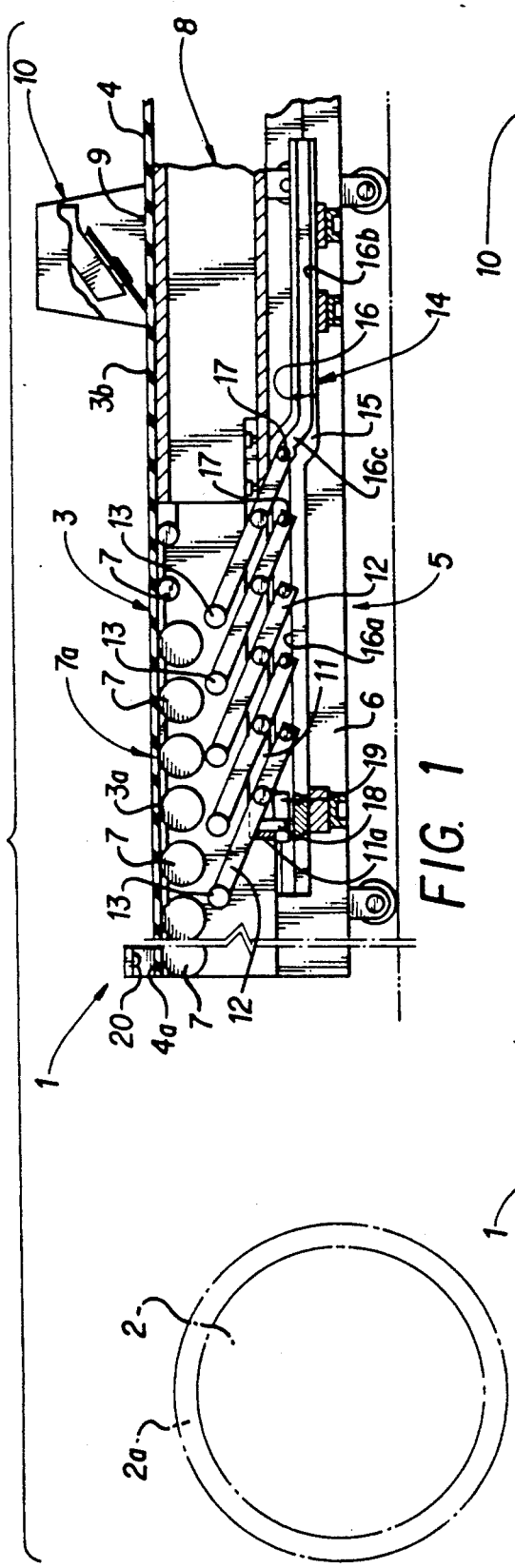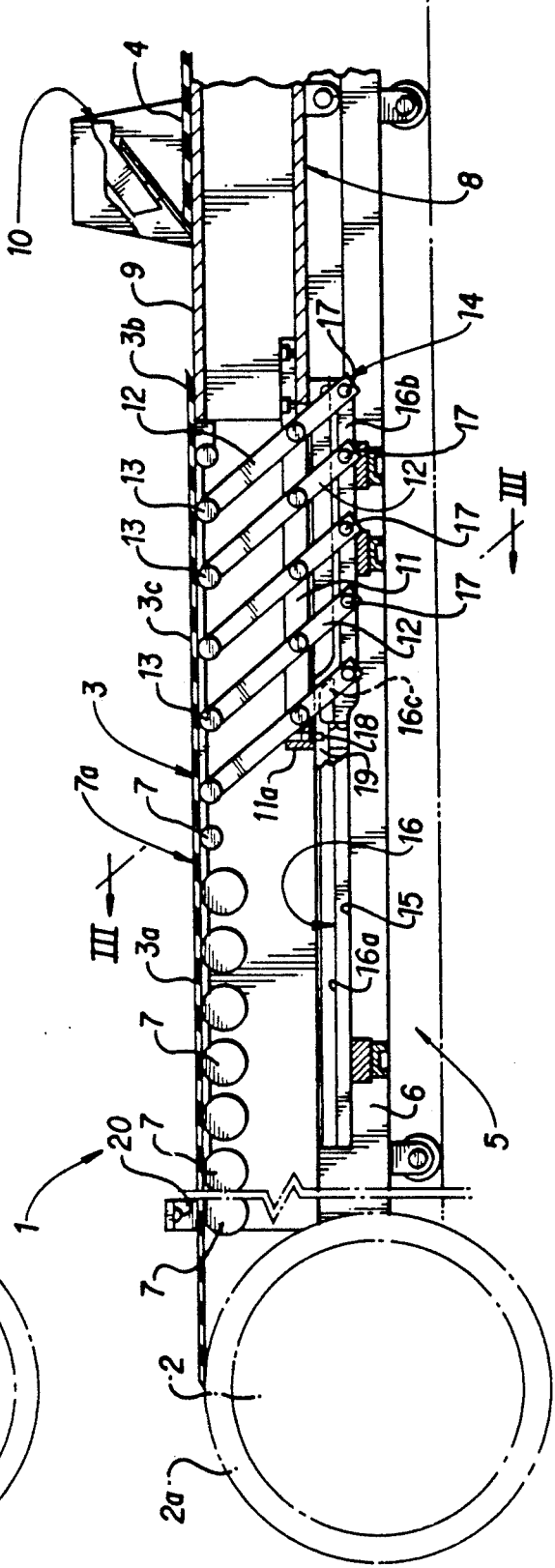

5,040,655

VARIABLE LENGTH ROLLER TABLE

DESCRIPTION OF THE INVENTION

The present invention relates to a variable length roller table, of the type comprising: a front supporting group having a plurality of rollers in parallel placed side by side and defining in the upper part a substantially horizontal front sliding surface disposed for supporting a front portion of a product that is being worked upon; a rear supporting group defining in the upper part a rear sliding surface longitudinally aligned with the front sliding surface and disposed for supporting a rear portion of the product; said front and rear supporting groups being movable so as to be mutually separated or approached according to their longitudinal development.

In the described example, the roller table of the present invention is arranged for supporting unfinished products of extruded elastomeric material to be used for building pneumatic tires of motor vehicles. Therefore in the present description a particular reference will be made to this type of use, although the inventive concept underlying the invention may be extended to applications quite different from those mentioned.

As is well known, the building of pneumatic tires for motor vehicles is carried out by assembling, by winding on a drum-making part of a so-called building machine, a plurality of unfinished products arranged in the form of segments cut to a pre-established length depending on the circumferential development of the drum on which they are to be wound.

Among these unfinished products there are some, such as for example the tread band and the sidewalls of a tire, which are made up entirely of elastomeric material still in the raw state. In the older production systems, the unfinished products of this type were obtained by means of cutting apparatuses that operated independently of the building machine and the segments cut to size were obtained from a strip of elastomeric material continuously produced by an extruder.

The thus obtained segments were loaded on trolleys and stored in a warehouse to be then withdrawn when necessary.

These segments, cut to size, were withdrawn from the warehouse, transported as far as the building machine and subsequently placed, one by one, onto a roller table associated with the machine itself. This roller table was provided with a plurality of idler rollers arranged on axes parallel to that of the drum of the building machine and consecutively placed side by side so as to define a horizontal sliding surface on which the unfinished product was made to slide longitudinally to be fed to the said drum.

The above described older production systems gave rise to several drawbacks; among them the first was the need for managing the warehouse for the storage of unfinished products of different dimensions. Moreover it was found that the unavoidable seasoning suffered by the material during its stay in the warehouse gave rise to some complications in the building of the pneumatic tire.

In order to eliminate the above mentioned drawbacks, it has been suggested to take care that the unfinished products of elastomeric material were cut to size on the roller table immediately before their use. In fact, in this way the supply is rationalized and besides the assembling of the unfinished products is carried out when these latter have newly-cut splice sections so that they have a higher degree of tackiness which facilitates the building of the tires and improves the results obtained.

In these production systems it is arranged such that the roller table associated with the building machine has a front supporting group facing the drum of the machine itself, provided with a plurality of main rollers (idle and/or motorized) defining in the upper part a front sliding surface disposed so as to support a front portion of the unfinished product. Moreover it is arranged so that a rear group defining in the upper part a rear sliding surface in correspondence with which a cutter operates for cutting the unfinished product in transverse direction.

More particularly, the unfinished product is moved forward along the roller table up to where it presents its own leading end in correspondence to a pre-established point, generally identified by a photoelectric cell arranged in proximity to the front end of the table itself. Subsequently, the cutter is set in motion for cutting from the unfinished product a segment of predetermined length, suitable for being associated with the pneumatic tire that is being made.

For various reasons, it has been found necessary that the front group and the rear group of the roller table have the possibility of being mutually separated and approached. The mutual movement of the groups is necessary, for example, to separate or to approach the cutter with respect to the photoelectric cell in order to obtain segments of different cut dimensions. Moreover, in many cases the front supporting group must be moved away from the rear supporting group and approached to the drum so that the leading end of the unfinished product is in correspondence with this latter, and subsequently moved away again from the drum so as to make space for other equipment used in the manufacture of the pneumatic tires.

It has been found that, at the present state of the technique, the mutual separation of the front and rear groups originates some drawbacks, due mainly to the fact that the unfinished product is not adequately supported in the portion of its development above the free space formed or forming between the supporting groups mutually spaced from each other. In fact, in the absence of any suitable support, the above mentioned segment portion tends to fall in consequence of gravity and consequently, to suffer undesired elongation and thinning phenomena, favored by the great plasticity of the elastomeric material in the raw state and in any case at high temperatures.

SUMMARY OF THE INVENTION

The main aim of the present invention is principally that of solving the above mentioned problem, by providing a variable length roller table wherein the unfinished product is adequately supported also in the portion between the front sliding surface and the rear sliding surface of the two supporting groups mutually spaced, independently of the distance between the groups themselves.

This aim, and others, that will become still better understood later in the present description, are substantially achieved by means of a variable length roller table, comprising at least one bearing bar fastened to the rear group, arranged in the lower part with respect to said sliding surfaces and extending in a substantially horizontal direction towards the front supporting group; a plurality of lifting levers distributed in a mutual approach relationship along the bearing bar and rotatably pivoted to the bearing bar itself in horizontal axes; a plurality of ancillary rollers connected in a rotatable manner with the upper ends of the single lifting levers in axes parallel to those of said main rollers; guiding means operating between the front supporting group and the lifting levers to lift, during the mutual separation of the front and rear supporting groups, the single ancillary rollers the one after the other from a rest position wherein they are in the lower part with respect to the sliding surfaces, to an operative position wherein they operate at the level of the sliding surfaces to support the product that is being worked upon in one of its intermediate portions extending between the front sliding surface and the rear sliding surface.

BRIEF DESCRIPTION OF THE DRAWINGS

Further features and advantages will still better appear from the following detailed description of a preferred, but not exclusive, embodiment of a variable length roller table according to the present invention, made hereinafter with reference to the attached sheets of drawings, supplied only by way of non-limiting example, wherein:

FIG. 1 is a lateral view of the roller table forming the object of the present invention in a condition in which the front group and the rear group are mutually approached;

FIG. 2 is a lateral view of the roller table provided with the front group and the rear group mutually separated.

DESCRIPTION OF THE PREFERRED EMBODIMENT

Figure 3:
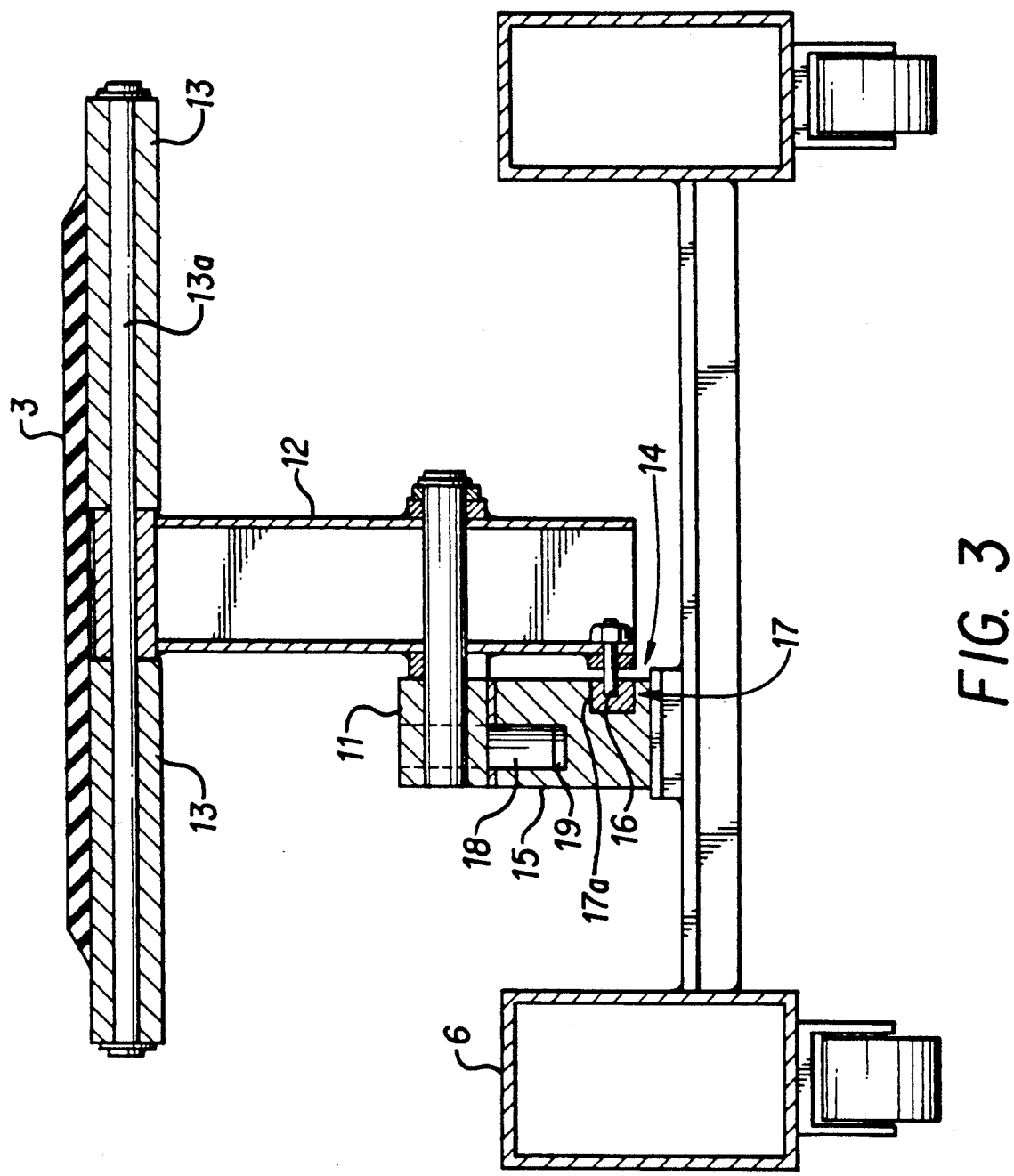
FIG. 3 is a section of the roller table along the line III—III of FIG. 2.

With reference to the figures, reference numeral 1 indicates a variable length roller table as a whole according to the present invention.

In the illustrated example, the roller table 1 is associated to a building machine for obtaining pneumatic tires, which is per se known and conventional and therefore the same is not further described or shown. More precisely, of this machine only the rotating drum 2 has been shown. Said rotating drum 2 is oriented according to a horizontal axis, and different components for producing a pneumatic tire 2a are assembled, the one after the other, by a winding operation on the drum itself.

The roller table is used for feeding the rotating drum 2, during the manufacture of each pneumatic tire, with a tread band 3 which is obtained by cutting to size a strip 4 of elastomeric material The strip 4 is positioned on the roller table 1 in a conventional and per se known manner and therefore said operation is not further described or illustrated.

The roller table 1 is provided with a front supporting group 5 having a supporting frame 6 on which there is a plurality of main rollers 7 in parallel and placed side by side. The rollers 7, oriented according to axes parallel to the axis of the drum 2, define in the upper part a horizontal sliding surface 7a for supporting, as shown in FIG. 1, a front portion 3a of the tread band 3 of any other product that is being made.

The front supporting group 5 is associated with a rear supporting group 8 defining in the upper part a rear sliding surface 9 longitudinally aligned with the front sliding surface 7a for supporting a rear portion 3b of the tread band 3.

Preferably the rear supporting group 8 is associated with a cutter 10 operating on the rear sliding surface 9 to cut, in a known and conventional manner, the single tread bands 3 from the strip 4.

The rear supporting group 8 is slidably guided with respect to the frame 6 of the front supporting group 5, so that the front and rear supporting groups themselves have the possibility of being mutually separated or approached according to their longitudinal development. In this respect, it can be indifferently seen that the front supporting group 5 is stationary and the rear supporting group 8 has the possibility of moving away from or coming near to the front supporting group to modify the longitudinal measure of the cut tread bands 3. Alternatively, it can be seen that the rear group 8 is stationary and the front supporting group 5 has the possibility of moving in such fashion as to modify the length of the cut tread bands 3, and/or coming near the drum 2 when the tread band 3 must be applied on the pneumatic tire 2a. Of course, it can also be seen that both the front supporting group 5 and the rear supporting group 8 may be movable.

In accordance with the present invention, the roller table 1 is provided with at least one bearing bar 11 fastened to the rear supporting group 8, arranged in the lower part with respect to the front sliding surface 7a and rear sliding surface 9 and extending in a substantially horizontal direction towards the front supporting group 5. A plurality of lifting levers 12, mutually placed at a predetermined distance from each other, is pivoted along the bearing bar 11 on horizontal axes and substantially parallel to the axes of the main rollers 7.

At least one ancillary roller 13 positioned on an axis substantially parallel to the axes of the rollers 7, is rotatably connected to the upper end of each lifting lever 12. More particularly, as clearly shown in FIG. 3, it is preferably arranged such that each ancillary roller 13 shall comprise a pair of cylindrical elements arranged symmetrically with respect to the corresponding lifting lever 12 and rotatably supported by at least one pin 13a rigidly engaged through the upper end of the lever itself.

Moreover, the roller table 1 according to the present invention comprises guiding means 14 operating between the front supporting group 5 and the lifting levers 12 to lift, during the mutual separation of the front supporting group 5 and the rear supporting group 8, the single ancillary rollers 13, the one after the other, from a rest position wherein said rollers are in the lower part with respect to the sliding surfaces 7a, 9 (FIG. 1), to an operative position wherein they operate at the level of the sliding surfaces to support the tread band 3 in one of its intermediate portions 3c extending between the front sliding surface 7a and the rear sliding surface 9 (FIG. 2). These guiding means 14 comprise preferably at least one guiding bar 15 secured to the frame 6 of the front supporting group 5, extending parallel to the longitudinal development of the sliding surfaces 7a, 9 and having at least one shaped guiding groove 16 along one of its lateral wall. The guiding groove 16 presents a front horizontal portion 16a and a rear horizontal portion 16b mutually offset in height and connected, in a middle zone of the total development of the groove itself, by an intermediate portion 16c providing an inclined development.

The guiding groove 16 engages in a sliding manner a plurality of feeler pins 17 each one associated with one of the lifting levers 12. More particularly, it is preferably so arranged such that each feeler pin 17 is formed by a sliding small roll 17a (FIG. 3) rotatably engaged in correspondence with the lower end of the corresponding lifting lever 12.

Preferably it is so arranged that the guiding bar 15 extends below the bearing bar 11 to provide a sliding supporting base for this latter. In this respect it is also so arranged that the bearing bar 11 is provided, in correspondence with its front end 11a, with a pin 18 slidably guided along an auxiliary groove 19 provided longitudinally in the upper part of the guiding bar 15.

The roller table according to the present invention functions as follows:

With particular reference to FIG. 1, when the front supporting group 5 and the rear supporting group 8 mutually approach each other, the bearing bar 11 extends below the rollers 7 and the feeler pins 17 of the single levers 12 are engaged in the front horizontal portion 16a of the shaped guide 16. In this situation, the levers 12 are oriented in such a way as to maintain the respective ancillary rollers 13 in rest position, below the rollers 7 belonging to the front supporting group 5.

In a way known per se, the strip 4 is moved forward onto the roller table 1 as far as its leading end, indicated with reference numeral 4a in FIG. 1, where it reaches a predetermined point on the front sliding surface 7a. This point can for instance be determined by at least one photoelectric cell 20 operating in proximity to the front end of the front sliding surface 7a. The intervention of the photoelectric cell 20 controls the actuation of the cutter 10 which cuts the strip 4 transversely so as to obtain a tread band 3 of predetermined length, equal to the distance between the photoelectric cell 20 and the cutter 10.

Also in a per se known way, the cut tread band 3 is suitable for being associated with the pneumatic tire 2a that is being made by winding it around the drum 2 of the building machine.

The front supporting group 5 and the rear supporting group 8 are arranged so as to be mutually removed from the condition of FIG. 1, for instance to vary the distance between the cutter 10 and the photoelectric cell 20 in order to obtain longer tread bands and/or to obtain the approach of the front supporting group 5 to the drum 2 when the tread band 3 is to be wound on the drum itself.

When the front group 5 and the rear group 8 are mutually separated, the feeler pins 17 slide along the front horizontal portion 16a of the guiding groove 16 to meet one after the other the inclined intermediate portion 16c. The feeler pins 17 arriving in proximity to the intermediate portion 16c are obliged to descend to reach the level of the rear horizontal portion 16b of the groove 16 and to engage therefore in the groove.

The lowering or descent of the single feeler pins 17 and, therefore of the corresponding lower ends of the lifting levers 12, produces an angular rotation of the lifting levers 12 around their own pivoting axes on the bearing bar 15. Following this angular rotation, the single ancillary rollers 13 are moved from be suitable for supporting adequately the tread band 3 in its intermediate portion 3c. Advantageously, as clearly appears from what has been described above, the ancillary rollers 13 are subject to be moved to the respective operative position one by one and one after the other, as the front supporting group 5 and rear supporting group 8 are separated.

Therefore, the number of ancillary rollers 13 moving to the operative position will always be suitable for the length of the intermediate portion 3c of the tread band 3 to be supported.

Of course, when the front supporting group 5 and the rear supporting group 8 approach each other again, the movement of the feeler pins 17 toward the front horizontal portion of the guiding groove 16 will bring about the lowering of the ancillary rollers 13 to their rest position, one by one and the one after the other, with a sequence opposite to that which has been previously described.

The present invention therefore attains the desired objectives. In fact the roller table of the present invention has a variable length, without thereby producing the drawbacks that are met, in the known technique, owing to the absence of an adequate support for the product that is being worked in the portion between the front sliding surface 7a and the rear sliding surface 9.

Moreover, it is to be noted that the roller table of the present invention has a very simple structure that can also be obtained by modifying or reconstructing the conventional roller tables of variable length according to per se known techniques.

What is claimed is:

1. A variable length roller table comprising:

a front supporting group having a plurality of main rollers placed side by side in parallel and defining in the upper part a substantially horizontal front sliding surface arranged for supporting a front portion of a product that is being worked;

a rear supporting group defining in the upper part a rear sliding surface longitudinally aligned with the front sliding surface and arranged for supporting a rear portion of the product that is being worked, said front and rear supporting groups being movable so as to be mutually separated and approached in their longitudinal development, characterized in comprising:

at least one bearing bar fastened to the rear supporting group, arranged in a lower part with respect to said sliding surfaces and extending in a substantially horizontal direction towards the front supporting group;

a plurality of lifting levers distributed in a mutual approach relationship along the bearing bar and rotatably pivoted to the bearing bar itself in horizontal axes;

a plurality of ancillary rollers, connected in a rotatable manner according to axes parallel to those of said main rollers, to the upper ends of the lifting levers;

guiding means operating between the front supporting group and the lifting levers to lift, during the mutual separation of the front and rear supporting groups, the ancillary rollers one after the other from a rest position wherein they are in the lower part with respect to the sliding surfaces, to an operative position wherein they operate at the level of the sliding surfaces for supporting the product that is being worked in one of its intermediate portions extending between the front sliding surface and the rear sliding surface.

2. A roller table according to claim 1, characterized in that said guiding means comprise:

a guiding bar fastened to the front supporting group, extending in parallel to the longitudinal development of the front and rear sliding surfaces and, provided along one of its lateral walls, with a shaped guiding groove having a front horizontal portion and a rear horizontal portion mutually offset in height and connected by an intermediate portion having an inclined development, said shaped guide engaging in a sliding manner a plurality of feeler pins each one borne by one of said lifting levers.

3. A roller table according to claim 2, characterized in that said guiding bar extends horizontally below the bearing bar and provides a sliding supporting base for the latter.

4. A roller table according to claim 3, characterized in that said bearing bar is provided with a pin guided in a sliding manner along an ancillary groove provided longitudinally in the upper part of the guiding bar.

5. A roller table according to claim 1, characterized in that each one of said ancillary rollers comprises a pair of cylindrical elements arranged symmetrically with respect to the corresponding lifting lever and rotatably applied on at least one pin rigidly engaged through the upper end of said lifting lever.

* * * * *